United States Patent
Bernhardt (10) Patent No.: US 11,941,956 B2
(45) Date of Patent: Mar. 26, 2024

(54) CASH MANAGEMENT SYSTEM, INTELLIGENT CASH HOLDING UNIT AND METHOD OF USE THEREOF

(71) Applicant: Tellermate Limited, Newport (GB)

(72) Inventor: Mark Bernhardt, Hants (GB)

(73) Assignee: Tellermate Limited, Newport (GB)

(*) Notice: Subject to any disclaimer, the term of this patent is extended or adjusted under 35 U.S.C. 154(b) by 0 days.

(21) Appl. No.: 16/345,076

(22) PCT Filed: Nov. 1, 2017

(86) PCT No.: PCT/GB2017/053280
§ 371 (c)(1),
(2) Date: Apr. 25, 2019

(87) PCT Pub. No.: WO2018/083459
PCT Pub. Date: May 11, 2018

(65) Prior Publication Data
US 2019/0251801 A1    Aug. 15, 2019

(30) Foreign Application Priority Data
Nov. 1, 2016    (GB) .................................... 1618437

(51) Int. Cl.
*G07G 1/01*    (2006.01)
*G06Q 10/10*    (2023.01)
(Continued)

(52) U.S. Cl.
CPC ............... *G07G 1/01* (2013.01); *G06Q 10/10* (2013.01); *G06Q 20/202* (2013.01);
(Continued)

(58) Field of Classification Search
CPC .. G07G 1/01; G07G 1/12; G07G 1/14; G07G 1/0027; G06Q 20/20; G06Q 20/202
See application file for complete search history.

(56) References Cited

U.S. PATENT DOCUMENTS

| 4,522,275 A | 6/1985 | Anderson |
| 5,366,404 A | 11/1994 | Jones |

(Continued)

FOREIGN PATENT DOCUMENTS

| EP | 0724242 A2 | 7/1996 |
| EP | 0856824 A2 | 8/1998 |

(Continued)

OTHER PUBLICATIONS

Anderson, R., Manifavas, C., Sutherland, C. (1997). NetCard—A practical electronic-cash system. In: Lomas, M. (eds) Security Protocols. Security Protocols 1996. Lecture Notes in Computer Science, vol. 1189. Springer, Berlin, Heidelberg. https://doi.org/10.1007/3-540-62494-5_4 (Year: 1996).*

(Continued)

*Primary Examiner* — Allen C Chein
*Assistant Examiner* — Aaron N Tutor
(74) *Attorney, Agent, or Firm* — Gerald T. Gray; Leydig, Voit & Mayer, LTD.

(57) ABSTRACT

A cash management system comprises a management terminal, a plurality of Electronic Point of Sale (EPOS) terminals and one or more intelligent cash holding unit. There are a greater number of EPOS terminals than intelligent cash holding units, whereby one or more intelligent cash holding unit acts as a virtual cash holding unit for more than one EPOS terminal. The or each intelligent cash holding unit comprises a receiver operable to receive a signal comprising an identifier associated with a user, an access module operable, in response to the received signal, to allow access to the intelligent cash holding unit, and a reporting module operable to send a report comprising an identifier relating to the user and data relating to the contents of the cash holding unit to the management terminal. The intelligent cash hold- (Continued)

ing unit can be an intelligent cash drawer unit, optionally connected to an intelligent point of sale safe.

14 Claims, 5 Drawing Sheets

(51) Int. Cl.
*G06Q 20/20* (2012.01)
*G07G 1/00* (2006.01)
*G07G 1/12* (2006.01)
*G07G 1/14* (2006.01)

(52) U.S. Cl.
CPC .............. *G07G 1/0027* (2013.01); *G07G 1/12* (2013.01); *G07G 1/14* (2013.01)

(56) References Cited

U.S. PATENT DOCUMENTS

| | | | |
|---|---|---|---|
| 5,883,371 A | 3/1999 | Meeker | |
| 8,141,772 B1 | 3/2012 | Folk et al. | |
| 9,460,589 B2* | 10/2016 | Charij | G01G 19/414 |
| 2005/0096986 A1* | 5/2005 | Taylor | G06Q 40/02 |
| | | | 705/16 |
| 2009/0236431 A1 | 9/2009 | Benigno et al. | |
| 2011/0172960 A1* | 7/2011 | St.George | G07G 1/14 |
| | | | 702/179 |
| 2012/0233006 A1 | 9/2012 | St. George et al. | |
| 2014/0058856 A1 | 2/2014 | Walters et al. | |
| 2014/0298027 A1* | 10/2014 | Roberts | G06Q 20/20 |
| | | | 713/171 |
| 2017/0118008 A1* | 4/2017 | Ammirata | H04L 69/16 |
| 2018/0096329 A1* | 4/2018 | Hamilton | G06Q 20/322 |

FOREIGN PATENT DOCUMENTS

| | | |
|---|---|---|
| GB | 2404768 A | 2/2005 |
| GB | 2407173 A | 4/2005 |
| GB | 2407194 A | 4/2005 |
| GB | 2411035 A | 8/2005 |
| GB | 2413679 A | 11/2005 |
| GB | 2460490 A | 12/2009 |
| GB | 2484311 A | 4/2012 |
| GB | 2500587 A | 10/2013 |
| WO | WO 2015/031264 A1 | 3/2015 |

OTHER PUBLICATIONS

Search Report and Application No. GB1618437.6, dated May 2, 2017.
Search Report and Application No. GB1718077.9, dated Mar. 22, 2018.
Search Report and Application No. PCT/GB2017/053280, dated May 7, 2018.
Examination Report and Application No. GB1618437.6, dated Jun. 7, 2018.
"What is an intelligent cash drawer?", Blog, Tellermate USA, URL:https://www.tellermate.com/news-and-resources/intelligent-cash-drawer, Jan. 19, 2016.

* cited by examiner

CASH MANAGEMENT SYSTEM, INTELLIGENT CASH HOLDING UNIT AND METHOD OF USE THEREOF

TECHNICAL FIELD OF THE INVENTION

The present invention relates to intelligent cash holding units that are each intended to be utilised with a plurality of associated Electronic Point of Sale devices (EPOSs), which each record transactions. In particular, but not exclusively, it relates to an improvement which allows data to be reconciled such that a single intelligent cash drawer unit (including flip-top and sliding drawer intelligent cash drawer units) can be used by users of more than one electronic point of sale device. It could also be used with an intelligent point of sale safe that is similar shared with a number of EPOSs, hence the expression intelligent cash holding unit. The invention also relates to an intelligent point of sale safe that is connected to an intelligent cash drawer unit.

BACKGROUND TO THE INVENTION

An intelligent cash drawer unit is a cash drawer unit which contains coins and notes in compartments called cups (obviously tokens, vouchers, or the like could also be contained in the cups, but generally speaking they are used for cash, hence the expression "cash drawer unit"). Unlike a conventional cash drawer, an intelligent cash drawer has cash counting apparatus as the individual cups are augmented with technology that allows them to be weighed. A transducer underneath each cup reads out a continuous analogue signal that represents the weight of the cup and its contents. This analogue signal is digitized and passed to a signal processor which can compute the weight of the cash contained in the cup. By dividing the weight of the contents of the cup by the known weight of a single coin or note of the appropriate denomination the quantity of notes or coins is computed.

A specific example of such a transducer is a 'load-cell' which changes its electrical resistance in response to the amount of weight placed upon it.

Intelligent cash drawers may be provided as separate cash drawer units with sliding cash drawers or with flip top lids which reveal the cash drawer, for use with associated EPOS devices, or can be integrated into cash registers. This invention concerns the former.

An intelligent point of sale safe is a safe with a note acceptor which validates that currency input is genuine and rejects counterfeits. An intelligent point of sale safe also comprises cash counting apparatus, as a processor in the safe records the value of each note that it input into it and number of notes that are input (deducts any which are output) and stores a denominational breakdown of its contents. Like an intelligent cash drawer unit, an intelligent point of sale safe may be associated with an EPOS device so that for any given transaction, the cash received and/or disbursed by the intelligent point of sale safe can be reconciled with the cash that should have been received and/or disbursed in accordance with that received from a customer in payment (as calculated by the EPOS).

Typically, there is a local connection between each intelligent cash holding unit and an associated EPOS, for example in a supermarket each EPOS may be locally connected to a cash drawer (and optionally also to an intelligent point of sale safe), for example by connection to USB ports in the EPOS and a local area network may be provided, by which each EPOS communicates to a local management terminal. This arrangement allows each EPOS to send data concerning the transactions and the contents of the cash drawer to the local management terminal which may conduct statistical analysis based on the results and bring any errors (such as missing cash) to a store manager's attention.

In other arrangements, cash drawers may be independently connected to the local area network and capable of transmitting their data to the local management terminal independently of the associated EPOS. In such instances, the management terminal is programmed when the store is set up to know which EPOS is associated with which intelligent cash holding unit (e.g. identified based on the lane number in-store) and the local management terminal is therefore capable of reconciling data received from the intelligent cash drawers with data from the associated EPOS.

In either case, the EPOS associated with a respective intelligent cash drawer unit sends a signal to the intelligent cash drawer unit to cause it to open, to allow the cashier to carry out the transaction (introducing cash and optionally taking out change or "cashback")

Obviously direct connection of both an intelligent cash drawer unit and an intelligent point of sale safe to an EPOS requires two ports, often USB connectors, at the EPOS. This is undesirable, because not all EPOSs have more than one USB connection, and it may be desired to connect other peripherals to those USB ports that are available.

Moreover, as society moves to a cashless way of trading, the inventors consider that the need for every single EPOS terminal to have an actual cash drawer connected to it is diminishing. One solution is to have separate tills for cash and non-cash (e.g. payment by credit card, Apple Pay™ or the like). However, this is rather cumbersome and inelegant.

An object of the invention is to provide an improved intelligent cash holding unit and an improved method of operating an intelligent cash holding unit.

SUMMARY OF THE INVENTION

According to a first aspect of the invention there is provided an intelligent cash holding unit comprising a receiver operable to receive a signal comprising an identifier associated with a user, an access module operable, in response to the received signal, to allow access to the intelligent cash holding unit, and a reporting module operable to send a report comprising an identifier relating to the user and data relating to the contents of the intelligent cash holding unit to at least one external device.

Such an intelligent cash holding unit can take its instruction to open not from an associated EPOS, but rather from an identifier associated with a user, in consequence, it does not need to be associated with any EPOS in particular and can only open when it receives the user's identifier, in which case the user will be nearby and ready to interact with the intelligent cash holding unit.

A signal comprising such an identifier can be provided by any suitable identification system, such as a card reader (e.g. magnetic strip or near field communication), RFID reader, barcode reader, biometric reader or the like.

The intelligent cash holding unit may integrally comprise one or more of such readers, or may be connected thereto, for example via a port, such as a USB, serial or Ethernet port. Connecting suitable readers through a port can be considered preferable, so as to integrate the reader with existing systems, such as those used with an EPOS or the like, rather than requiring any particular tag to be used to suit whichever reader is comprised in the intelligent cash holding unit.

Having taken its instruction to open from the card, tag, biometric feature or the like used by the user, the intelligent cash holding unit of the invention sends a report comprising the identifier relating to the user and data relating to the contents of the cash holding unit. This allows an external device, such as a local or remote management terminal, or the like, to associate the transaction with the user.

The data relating to the contents of the cash holding unit may comprise the total amount added to or removed from the intelligent cash holding unit, optionally broken down by denomination. This is particularly useful for reconciling a transaction at the intelligent cash holding unit with a transaction at an EPOS.

In consequence, the management terminal may reconcile transactions carried out at by a user at an EPOS with transactions carried out by that user at a shared cash drawer and back-office reporting systems can ensure that the amount of cash introduced into and/or taken from the shared cash drawer by each user corresponds to the amount that should have been introduced or taken out, in accordance with the transactions recorded by that user at an EPOS.

Additionally, or alternatively, the data relating to the contents of the cash holding unit may be an indication of the number of items (e.g. coins or notes) of each denomination held in the unit, an indication of the total value of each denomination, an indication of the total value of all denominations, or (in an intelligent cash drawer unit) the weight of cash in each of a plurality of note cups and/or coin cups (from which the total number and hence value can be determined).

The reporting module may be operable to send a report in which the identifier relating to the user is the identifier associated with the user. Alternatively, for example, a lookup table could be provided, and the intelligent cash holding unit may comprise memory storing the lookup table, and a different, e.g. more concise, identifier relating to the user could be sent instead of the raw identifier.

The reporting module may be operable to send the report as a data packet, in which the identifier relating to the user and data relating to the contents of the cash holding unit are collated.

The reporting module may additionally be operable to transmit a serial number associated with the intelligent cash holding device. The serial number may be stored in memory and may be collated in the data packet. This allows a management terminal to monitor several intelligent cash holding devices and distinguish between them.

The intelligent cash holding unit may comprise a timing unit, and the reporting module may be operable to transmit and/or to store the time and optionally the date of each transaction/event (e.g. based on a signal received, allowance of access, or report sent). The time and/or date may be collated in the data packet.

The timing unit may be a clock and in particular may be a real-time clock. The clock may be provided with an independent power source, such as a battery, in particular a rechargeable battery, so as to maintain time during power outages.

This is particularly useful when reporting to a remote management terminal, because data transmitted through a WAN or IAN tends to arrive asynchronously. Accordingly transmitting the time as well as the indication allows the data from the intelligent cash holding unit to be reconciled with data from an associated EPOS at the same point in time.

Storing the time as well as the indication allows missing data to be checked by checking that the time stamp is correct and to be obtained by requesting indications from a certain period in time.

The intelligent cash holding apparatus may comprise a counter which may increment each time access is allowed, to provide a sequence number identifying the transaction.

The reporting module may additionally transmit a sequence number identifying the transaction. The sequence number may be collated in the data packet.

The intelligent cash holding unit may be an intelligent cash drawer or may be an intelligent point of sale safe.

The intelligent cash holding unit may be an intelligent cash drawer unit and the access module may be operable to send a signal to an actuator to open the intelligent cash drawer unit, for example to open a lid to allow access to a drawer, or slide a drawer outward.

The drawer of the intelligent cash drawer unit may comprise a plurality of note cups and coin cups supported by transducers arranged to determine the weight of the contents of the cups and hence the value of the currency in the intelligent cash drawer unit.

In a second aspect of the invention, there is provided a cash management system, the cash management system comprising a management terminal, a plurality of Electronic Point of Sale (EPOS) terminals and one or more intelligent cash holding unit according to the first aspect of the invention (including any of the optional features), wherein there are a greater number of EPOS terminals than intelligent cash holding units, whereby one or more intelligent cash holding unit acts as a virtual cash holding unit for more than one EPOS terminal.

In the cash management system, each EPOS terminal and each intelligent cash holding unit may comprise a reader. Each reader may be integrally comprised in each intelligent cash holding unit and/or EPOS terminal, or may be connected to each intelligent cash holding unit and/or EPOS terminal.

Each reader may be arranged to read a tag or biometric feature associated with a user comprising an identifier associated with the user. For example, the readers may be operable to read magnetic strips or near field communication units, RFID tags, barcodes, biometric features or the like. The system may comprise tags each comprising an identifier associated with a user. The tags may be readable by the readers associated with both the EPOS terminals and the intelligent cash holding devices.

The EPOS terminals may be operable to calculate an amount owed based on inputs (such as signals from a barcode reader, or user inputs) and optionally operable to calculate change or "cash-back" due and operable to output the amount owed to the management terminal together with an identifier relating to the user.

The management terminal may be arranged to reconcile transactions by comparing the amount owed to a particular user with the amount introduced into the intelligent cash holding unit by that user, based on the identifier associated with the user's tag.

In a third aspect of the invention, there is provided a method of operating an intelligent cash holding unit, the method comprising receiving a signal comprising an identifier associated with a user, in response to the received signal, allowing access to the intelligent cash holding unit, and sending a report comprising an identifier relating to the user and data relating to the contents of the cash holding unit to at least one external device.

The data relating to the contents of the cash holding unit may comprise the total amount added to or removed from the intelligent cash holding unit, optionally broken down by denomination.

Additionally, or alternatively, the data relating to the contents of the cash holding unit may be an indication of the number of items (e.g. coins or notes) of each denomination held in the unit, an indication of the total value of each denomination, an indication of the total value of all denominations, or (in an intelligent cash drawer unit) the weight of cash in each of a plurality of note cups and/or coin cups (from which the total number and hence value can be determined).

The method may comprise sending a report in which the identifier relating to the user is the identifier associated with the user. Alternatively, for example, the method may comprise looking up the identifier associated with the user in a lookup table and sending a more concise, identifier relating to the user instead of the raw identifier.

The method may comprise sending the report as a data packet, in which the identifier relating to the user and data relating to the contents of the cash holding unit are collated.

The method may additionally comprise transmitting a serial number associated with the intelligent cash holding device. The method may comprise looking up the serial number from memory and collating it in the data packet.

The method may comprise transmitting the time and optionally the date of each event (e.g. based on a signal received, allowance of access, or report sent). The method may comprise collating the time and/or date in the data packet.

The method may comprise saving the time and optionally the date along with an identifier associated with a user and data relating to the contents of the intelligent cash holding unit.

The method may further comprise transmitting a sequence number, which increments each time access is allowed to identify the transaction.

The method may also save the sequence number, together with the time and optionally the date, an identifier associated with a user and data relating to the contents of the intelligent cash holding unit.

The method may be conducted by an intelligent cash drawer unit and the method may comprise the step of sending a signal to an actuator to open the intelligent cash drawer unit, for example to open a lid to allow access to a drawer, or slide a drawer outward.

The method may comprise measuring the weight of currency in a plurality of note cups and coin cups to determine the value of the currency in the intelligent cash drawer unit.

In a fourth aspect of the invention, there is provided a management terminal operable to reconcile transactions carried out by a user on a separate EPOS and intelligent cash drawer unit, the management terminal operable to reconcile data by receiving from the intelligent cash holding unit data relating to the contents of the intelligent cash holding unit together with an identifier relating to the user and receiving from the EPOS terminal data indicating the amount owed together with an identifier relating to the user and comparing the data where the identifiers relating to the user match.

The management terminal may be operable to receive data from the intelligent cash holding unit and the EPOS and compare data where the identifiers relating to the users and time stamps included in the data match.

In a fifth aspect of the invention, there is provided an intelligent cash drawer unit operable in tandem with an intelligent point of sale safe; the intelligent cash drawer unit comprising: a receiver operable to receive a signal from the intelligent point of sale safe comprising data relating to the contents of the intelligent point of sale safe; and a reporting module operable to send a report comprising an identifier relating to a user and data relating to the contents of the intelligent cash drawer unit and the contents of the intelligent point of sale safe to at least one external device.

Such an arrangement has a number of benefits. First and foremost, where both a drawer unit and a safe would otherwise have been directly connected to an EPOS device, having the drawer capable of sending a report including data from the safe saves a connection at the EPOS—this can be a big advantage.

Additionally, when connected to the drawer in this manner, the drawer can be used as a virtual cash holding unit (as set out above), with the safe also acting as a virtual intelligent cash holding unit, as an extension to that virtual cash drawer unit. Thus the intelligent cash drawer unit and intelligent point of sale safe can be shared between a plurality of EPOSs and a plurality of users (which can be an even greater number than the number of EPOSs, if the users share EPOSs), while retaining all the advantages that would be achieved by each EPOS having its own intelligent point of sale safe (in particular a reduction in the number of cash-lifts required as large denomination notes are held securely in the safe, not accessible in the intelligent cash drawer unit.

Of course, in a situation of use of the intelligent cash holding units by multiple users, one can expect the build-up of cash to be more rapid, so reducing the number of times cash must be removed to a secure location is a major benefit.

The intelligent cash drawer unit may have an openable cash drawer comprising a plurality of cups supported on a plurality of transducers operable to weigh the cups, a signal processor operable to process signals received from the transducers to determine the value of cash in the cups, and a sensor operable to detect whether the drawer is open or closed.

The intelligent cash drawer unit may be an intelligent cash holding unit according to the first aspect of the invention, including optional features, and may comprise only optional features, not all the features set out in the first aspect.

The intelligent cash drawer unit may be connected to the intelligent point of sale safe. It may be directly connected to the intelligent cash drawer. It may be directly connected by a cable, for example a USB, Serial or Ethernet cable.

The receiver may be operable to receive a signal comprising an identifier associated with a user. The signal comprising the identifier associated with the user may be received from the intelligent point of sale safe. The receiver may receive a signal comprising a data packet in which the identifier associated with the user and the data relating to the contents of the intelligent point of sale safe. Alternatively, the signal comprising the identifier associated with the user may be received from a suitable identification system integral with or connected to the intelligent cash drawer unit, such as a card reader (e.g. magnetic strip or near field communication), RFID reader, barcode reader, biometric reader or the like.

A sixth aspect of the invention provides a system comprising an intelligent cash drawer unit according to the fifth aspect of the invention and an intelligent point of sale safe connected thereto.

The intelligent cash drawer unit may be directly connected to the intelligent point of sale safe. It may be directly connected by a cable, for example a USB, Serial or Ethernet cable.

The intelligent point of sale safe may draw power from the intelligent cash drawer unit, for example through a cable. Data and power may be exchanged between the intelligent cash drawer unit and the intelligent point of sale safe through the same cable.

Allowing power to be drawn from the intelligent cash drawer unit means that additionally to saving a connection at the EPOS (since data can flow to the intelligent cash drawer unit, rather than to an EPOS), a power connection can also be saved.

The system of the sixth aspect may also comprise any other optional features of the fifth aspect of the invention, including optional features of other aspects of the invention. Indeed, either or both of the intelligent cash holding units of the sixth aspect (that is to say, either or both of the intelligent cash drawer unit and the intelligent point of sale safe) may comprise any of the optional features of the other aspects of the invention. The optional features may be included alone, that is to say, not together with all of the features of the aspect on which they depend.

The intelligent cash drawer unit of the fifth or sixth aspect of the invention may send a report comprising the identifier relating to a user, data relating to the contents of the intelligent cash drawer unit and the intelligent point of sale safe and additionally any combination of: the serial number of the drawer; the time and optionally the date, a sequence number identifying the transaction and in the event that a counterfeit note was tendered and rejected by the safe, a flag to that effect. Preferably all of that information is reported, optionally collated into a single data packet.

The data relating to the contents of the intelligent cash drawer unit and the intelligent point of sale safe may be reported as a denominational breakdown of the contents of the intelligent cash drawer unit and the intelligent point of sale safe.

Optionally, the serial number of the safe is also included in the report.

In any of the foregoing aspects of the invention, the or each intelligent cash holding unit may be an intelligent cash drawer unit having an openable cash drawer comprising a plurality of cups supported on a plurality of transducers operable to weigh the cups, a signal processor operable to process signals received from the transducers to determine the value of cash in the cups, and a sensor operable to detect whether the drawer is open or closed.

The sensor operable to detect whether the drawer is open or closed may be a micro-switch.

The intelligent cash drawer unit may comprise a plurality of note cups and coin cups arranged on respective load cells comprising transducers. For example, the load cells may be strain gauge load cells.

The intelligent cash drawer unit may comprise a flip-lid cash drawer unit, or an intelligent cash drawer unit comprising a sliding drawer.

DETAILED DESCRIPTION OF THE INVENTION

In order that the invention may be more clearly understood an embodiment thereof will now be described, by way of example only, with reference to the accompanying drawings, of which.

Figure 1:
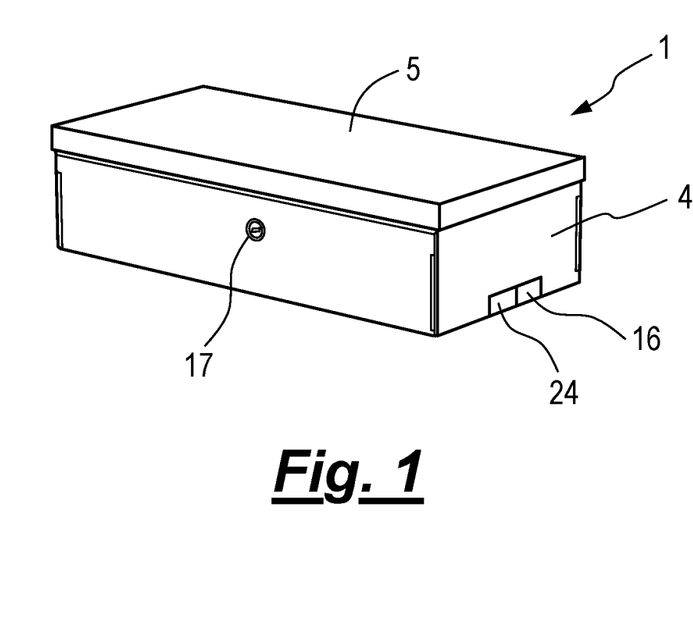
FIG. 1 shows perspective view of an intelligent cash drawer unit according to an embodiment of the invention in the closed state.
Figure 2:
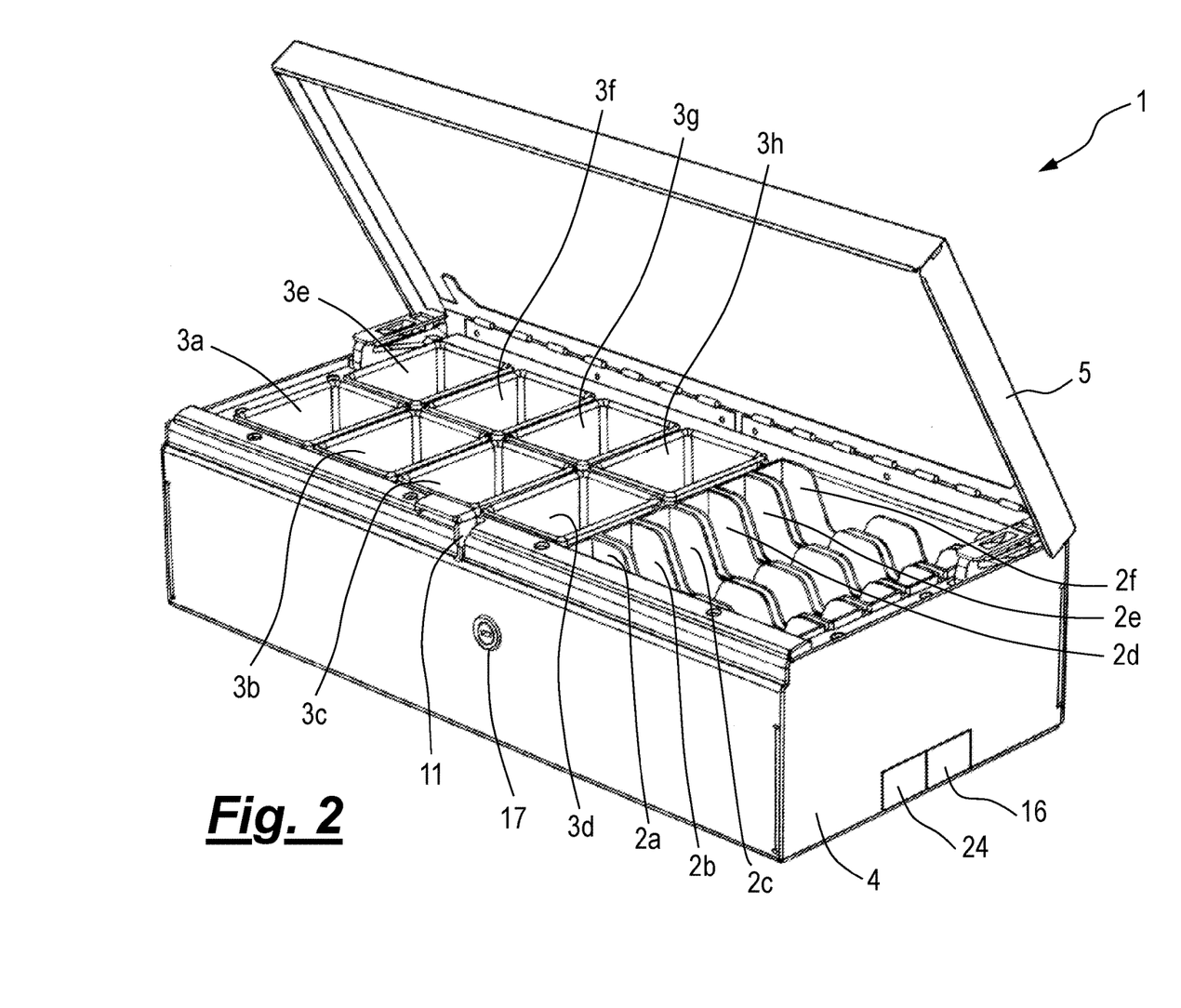
FIG. 2 shows a perspective view of the intelligent cash drawer unit of FIG. 1 in the open state.

With reference to the figures, in particular FIGS. 1 and 2, an intelligent cash holding unit in the form of an intelligent cash drawer unit 1 is provided with a number of note cups 2a, 2b, 2c, 2d, 2e, 2f (together 2), and coin-cups 3a, 3b, 3c, 3d, 3e, 3f, 3g, 3h (together 3) arranged within a housing 4. The intelligent cash drawer unit is of the "flip-top" type and comprises a lid 5 hingedly attached to the rear of the housing 4 and arranged to close the top of the housing 4.

The intelligent cash drawer unit 1 is intended for use in a cash management system with a plurality of separate EPOS terminals 19a-n (shown in FIG. 4), wherein there are a greater number of EPOS terminals 19a-n than intelligent cash holding units, whereby one or more intelligent cash holding unit acts as a virtual cash holding unit for more than one EPOS terminal 19a-n. Of course, those skilled in the art will appreciate that the intelligent cash holding unit could be an intelligent cash drawer unit 1 of the "sliding drawer" type, well known to those skilled in the art, and that many of the features of the intelligent cash drawer unit 1 could equally apply to an intelligent point of sale safe 25.

As is typical, the intelligent cash drawer unit 1 of this embodiment is cuboid, with a long front and shorter sides. The note cups 2 are so-called "vertical" note cups. These vertical note cups 2 are intended and designed to receive notes with their plane substantially vertical, having their long axes horizontal and their short axes vertical. Consequently, the vertical note cups 2 are taller than they are wide and longer than they are tall. The vertical note cups 2 all have their long axes extending parallel to the front and rear of the intelligent cash drawer unit 1 and are arranged in the right hand side of the housing 4, one behind another. They are each intended to receive a specific denomination of note and may be provided with indicia indicating the note they are intended to receive.

The coin cups 3 are intended and designed to receive coins. They are arranged to the left of the note cups 2, in two rows of four, one row behind the other. The coin cups are intended to each receive a specific denomination of coin and may also be provided with indicia showing the denomination they are intended to receive.

The housing 4 and lid 5 of the cash drawer 1 of this embodiment of the invention is in metal, but of course other suitable materials are available (metal has the advantage of shielding components (e.g. load cells, ADC and other circuitry discussed below from electrical noise). The cups 2, 3 in this embodiment are formed from ABS plastic material, e.g. by injection moulding, but of course, other plastics materials, or even other different non-plastics materials could be used.

Figure 3:
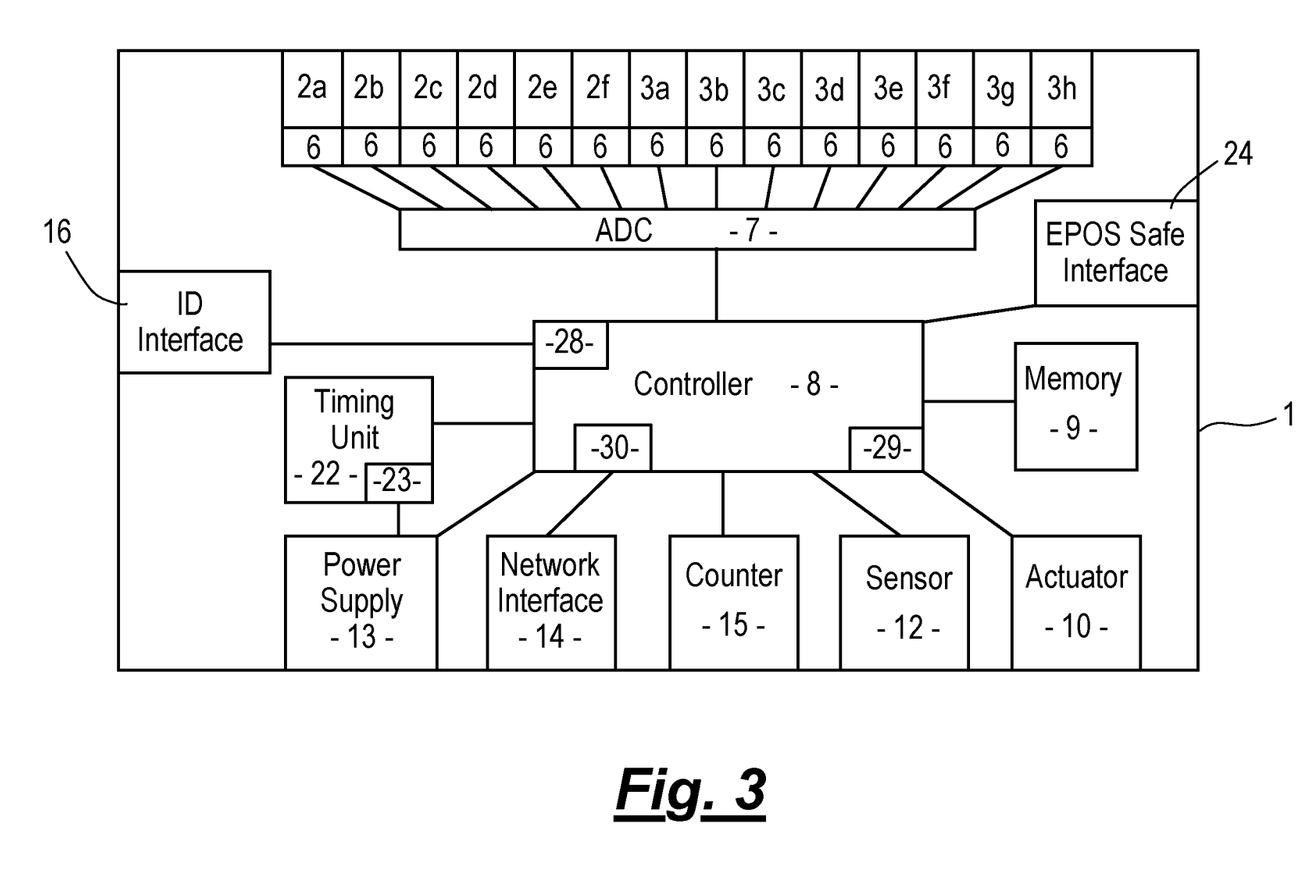
FIG. 3 shows a schematic electrical diagram of the intelligent cash drawer unit of FIGS. 1 and 2.

As shown schematically in FIG. 3, each cup 2, 3 is supported on a load cell 6 (not visible in FIGS. 1 and 2), in the form of conventional strain gauge load cells 6 which each comprise a transducer which outputs an analogue electrical signal which varies according to the weight on the load cell 6 to an analogue-digital converter (ADC) 7.

The ADC 7 is connected to a signal processor, or controller, 8 which in turn is connected to a memory component 9, an actuator 10 (to actuate the latch mechanism 11 shown in FIG. 2 and open the lid 5), a sensor 12 in the form of a micro-switch, arranged to detect opening/closing of the lid 5) a power supply 13, a network interface 14, an ID-system interface 16 and a timing unit 22, in the form of a real-time clock comprising a back-up battery 23, which is rechargeable from the power supply 13 in order that the timing unit 22 is capable of maintaining time during power outages. The controller is also connected to a counter 15 and to an EPOS Safe interface 24.

Figure 4:
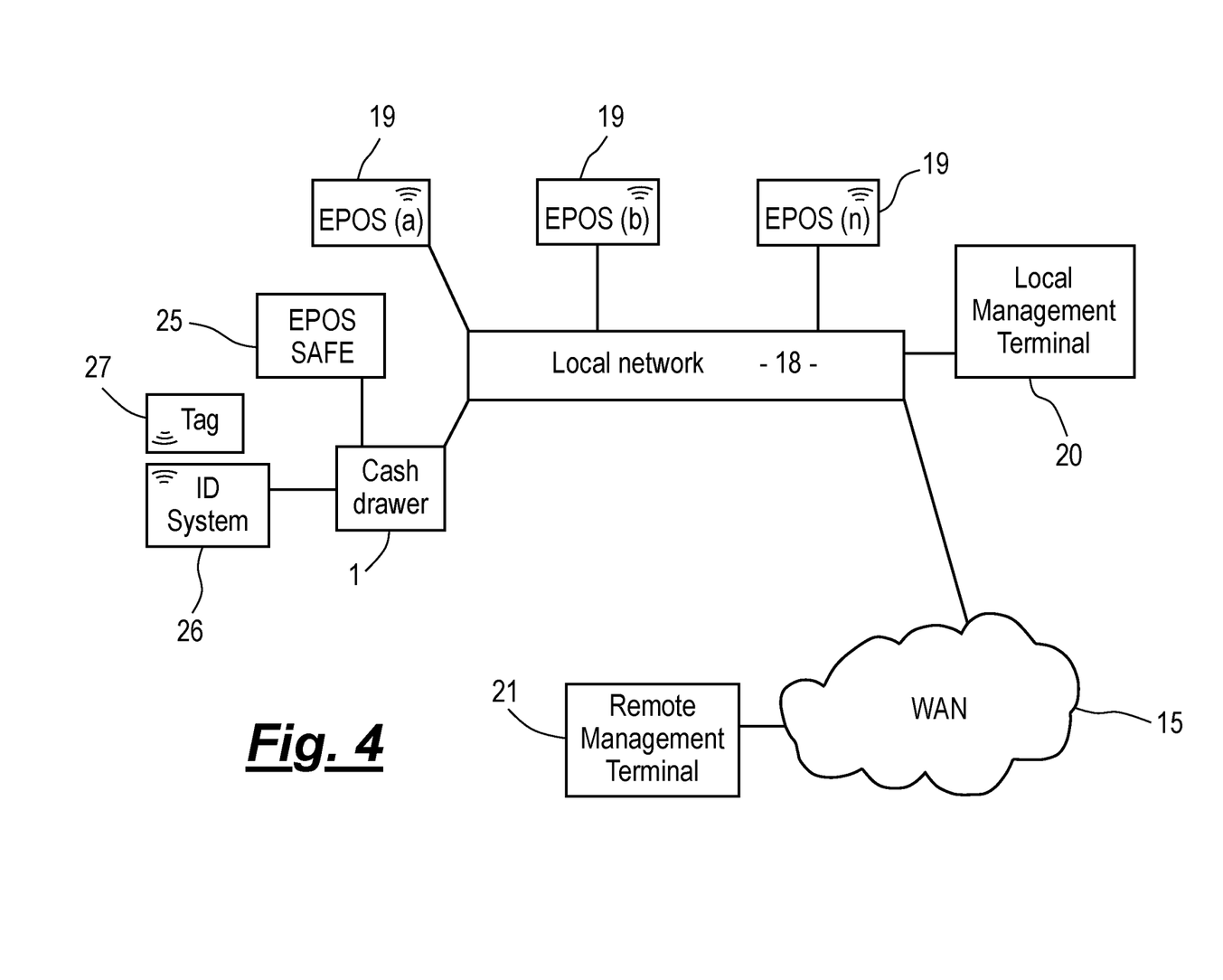
FIG. 4 shows a schematic diagram of a cash management system comprising an intelligent cash drawer unit in communication with a plurality of EPOS terminals according to FIGS. 1-3.
Figure 5:
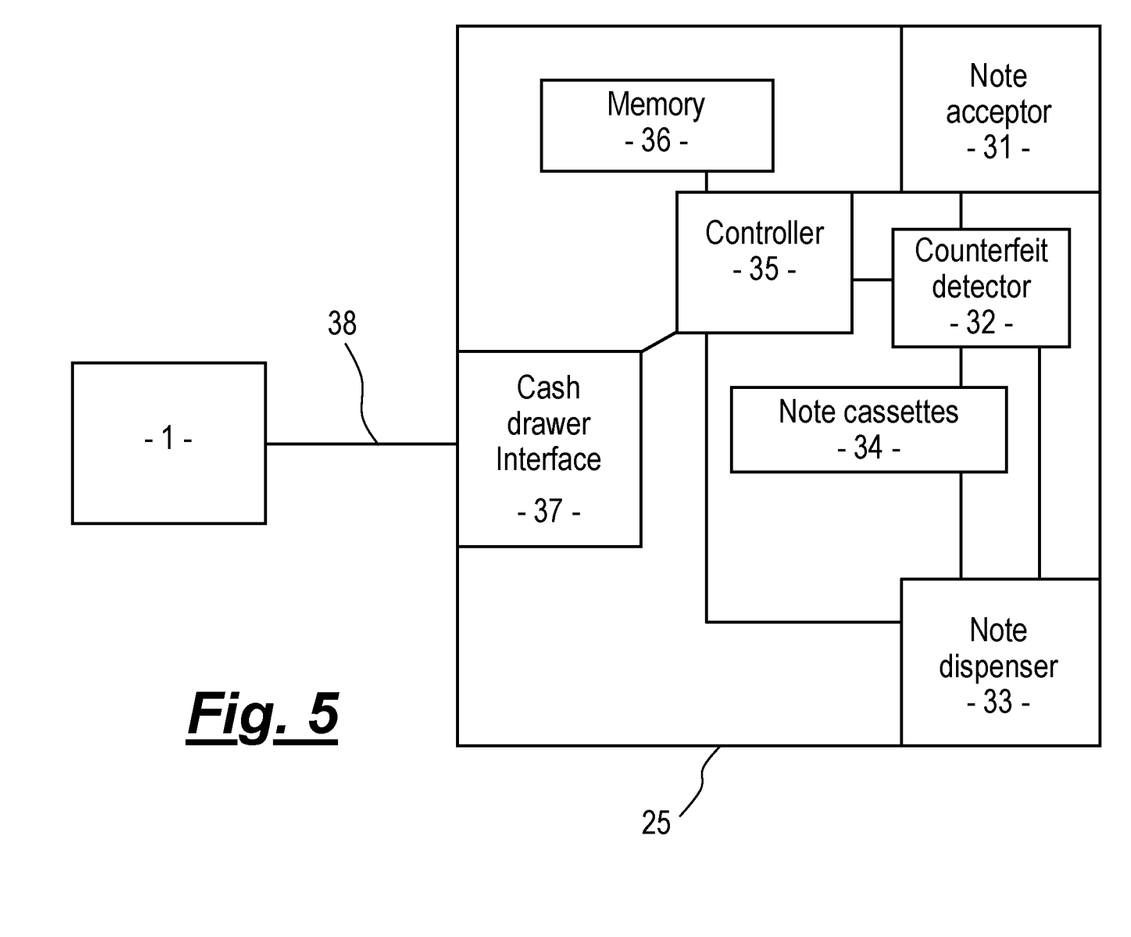
FIG. 5 shows a schematic diagram of an intelligent point of sale safe connected to an intelligent cash drawer unit according to FIGS. 1-3.

The network interface 14 is a communications bus and comprises a transceiver to transmit data to and receive data via a Local Area Network (LAN) 18 (e.g. Ethernet or Wi-Fi), to a Wide Area Network (WAN) 15 or Internet Area Network (IAN) 16 as shown in FIGS. 4 and 5 respectively. In this way it can communicate with an external device in the form of a remote management terminal 21, which may be a server or local computer 21 in a remote location connected to the WAN 15, or could be a virtual terminal formed in the "cloud" or IAN. The network interface 14 additionally allows the intelligent cash drawer unit 1 to communicate with other terminals via the LAN 18, such as a plurality of separate associated EPOS terminals 19 and a local management terminal 20 shown schematically in FIG. 4.

The ID-system interface 16 is a receiver with a port, such as a Serial port, USB port, or Ethernet port suitable for connection to an ID system 26 (FIG. 4), in the form of a reader operable to read magnetic strips or near field communication units, RFID tags, barcodes, biometric features or the like. It is preferably capable of providing power to the ID system via a cable connected to the port.

The EPOS Safe interface 24 comprises a transceiver and a power output, having a port to which an EPOS safe 25 may be connected, such that power can be supplied to the EPOS safe 25 and data received from (and optionally supplied to) the EPOS safe 25.

The micro-switch 12 is arranged to be closed by closure of the lid 5, such that it registers opening as soon as the lid 5 starts to open.

The actuator 10 of this embodiment is a solenoid arranged to unlatch the latch mechanism 11. Also visible in FIG. 1 is the keyhole of a lock 17, to manually open the intelligent cash drawer unit 1.

The controller 8 controls the operations of the intelligent cash drawer unit 1, based on instructions stored in software in memory 9.

Memory 9, in addition to storing the software on the basis of which the signal processor 8 controls the intelligent cash drawer unit 1, is also operable on instruction from the signal processor 8 to store data, including data from the transducers, data received from the ID system 26 and/or EPOS Safe 25 and data including the unique ID or serial number of the intelligent cash drawer unit 1, used to identify the intelligent cash drawer unit 1 when reporting to the remote management terminal 21. Memory 9 comprises non-volatile memory (such as a hard disc, flash memory, EEPROM or battery backed RAM) in order to store information even in the event of loss of power.

The intelligent cash drawer unit 1 receives an "open" signal a sent by an associated ID system 26 once it has received an ID code associated with a tag 27 carried by a user (such as an RFID tag, in the case that the ID system 26 is an RFID reader). The "open" signal comprises (and may consist of) the identifier associated with the user. The tag 27 is preferably also used with the EPOS terminals 19a-19n (as is conventional) and is used to open the intelligent cash drawer unit 1 after the EPOS terminal 19 has calculated the value of the transaction and the amount of currency required to be introduced into or removed from the intelligent cash drawer unit 1 and transmitted the amount owed to the remote terminal 19, together with an identifier associated with the user, on the basis of their tag 27.

The following description covers the ordinary operation of the intelligent cash drawer 1, when not connected to the optional EPOS safe 25.

In response to the open signal, received by a receiving module 28 in the controller 8, an access module 29 in the controller allows access to the intelligent cash drawer unit 1 by activating the actuator 10 to undo the latch mechanism 11 so that the lid 5 opens. The controller 8 also saves the identifier associated with the user to the memory 9. The cashier will then introduce cash that has been received and optionally take out change (or take out "cash-back" for a customer), then close the lid 5.

According to this embodiment of the invention, the controller 8 is operable (in accordance with the operating system stored in memory 9) to process signals from the transducers of the load cells 6 each time that the sensor 12 detects that the drawer has been closed and to determine the weight of cash in the cups (2, 3), in order to calculate the value of the contents of the intelligent cash drawer unit 1, in terms of the number of items of each denomination in the intelligent cash drawer unit 1. Using known algorithms, the controller 8 will process signals from the load cells 6 until a stable reading is obtained, i.e. once readings have settled.

Having calculated the number of items of each denomination, a reporting module 30 in the controller 8 is operable to send a report comprising an identifier relating to the user and data relating to the contents of the intelligent cash holding unit 1 to at least one external device via the network interface 14. Specifically, the reporting module 30 is operable to transmit a data packet with an indication of the contents to the local management terminal 20 and the remote management terminal 21. It is contemplated that the identifier relating to the user could be a concise ID stored in a lookup table in memory 9 and corresponding to the identifier associated with the user received from the ID system, which may be longer. However, for simplicity, in this embodiment the identifier relating to the user is the identifier associated with the user, as stored on the tag 27 and read by the ID system 26.

The indication of cash held in the unit may be an indication of the number of items (e.g. coins or notes) of each denomination held in the unit, an indication of the total value of each denomination, an indication of the total value of all denominations, or (where the intelligent cash holding unit 1 is an intelligent cash drawer unit) the weight of cash in each cup (from which the total number and hence value can be determined), or indeed, the indication could be an indication of the change in the contents after each transaction (e.g. the total value of cash introduced and/or removed optionally broken down by denomination). In this embodiment, the indication is a breakdown of the number of items of each denomination held in the unit.

The controller 8 is also operable to store each indication in memory 9 and operable to maintain a count, incrementing a counter 15 each time that the drawer is closed and the weight is determined, and storing the count as a sequence number together with the indication of the contents of the cups 2,3.

The controller 8 is further operable to store the time and date of each indication of the contents of the drawer in a database in memory 9, together with the corresponding sequence number and indication of the contents of the intelligent cash holding unit 1.

All of this information is also included in the data packet prepared by the reporting module 30 and sent to the remote terminal 21 (for example via a TCP/IP protocol addressing the remote terminal by its IP address, which during setup is stored to the memory 9). The controller 8 is thus operable, each time the drawer is closed to transmit a data packet to the remote terminal 21, each data packet including (a) an identifier relating to the user, (b) the serial number of the intelligent cash drawer unit 1, (c) the time and date (d) the sequence number and (e) the denominational breakdown of the contents of the drawer.

The identifier, the time and date, the sequence number and the denominational breakdown of the contents of the drawer may be stored as a buffer, i.e. the earliest data may be overwritten periodically, for example as memory 9 becomes full. And being obtainable by the remote terminal in the event that a report is lost. The time and date of each event can be characterised as the time that a signal is received, time that access is allowed, or ceased or the time the report is sent). Great accuracy is not normally required, given that any given transaction will normally take several seconds, and there are likely to be at least tens of seconds, if not minutes between transactions.

With reference to FIG. 4, a remote terminal 21, which may be located in a head-office monitors an intelligent cash drawer unit 1, which is shared between a plurality of EPOSs; a first EPOS 19*a*, a second EPOS 19*b*, and further EPOSs 19*n* that are arranged in a retail environment (e.g. a bar or department store) and connected to a local area network 18. The remote terminal 21 is connected to the local area network 18 via a wide area network 15, for example over the internet. The remote terminal 21 is arranged to monitor a plurality of intelligent cash drawer units 1 and EPOSs 19*a*, 19*b*, 19*n* in a number of stores, but for simplicity, only one is shown.

The intelligent cash drawer unit 1 is associated with the first EPOS 19*a*, the second EPOS 19*b* and EPOS terminals 19*n*.

Each EPOS 19*a*-*n*, as is conventional, is arranged to receive an identifier associated with a user from one tag 27 of a number of tags 27, each held by an individual user, generally speaking in which there are more tags 27 than EPOS terminals 19*a*. Having received the identifier associated with the user (e.g. via an integral RFID reader, the EPOS terminal determines the amount of money owed in each transaction, based on inputs, such as barcodes read, or user-inputs through a keypad or touchscreen. The EPOS terminal then transmits data in relation to each transaction (including the identifier associated with the user (i.e. in this case with the tag 27 used by the user)) to the local management terminal 20. The local management terminal 20 is arranged to transmit that data to the remote management terminal 21 via the WAN 15, including an indicator of which EPOS 19*a*-*n* and which user it relates to.

If payment is taken by credit card, for example, or other non-cash means, this can be done directly at the EPOS, and the amount of payment taken can be transmitted to the management terminals 20, 21 too.

However, where cash payment is taken, the user takes the cash to the cash drawer 1, presents his/her tag 27 to the ID system 26, which reads the identifier associated with the user and operates as discussed above. With the transaction complete, the intelligent cash drawer unit 1 sends a data packet in relation to each transaction, as set out above, each data packet, sent each time the drawer is closed including (a) the identifier relating to the user, (b) the serial number of the intelligent cash drawer unit 1, (c) the time and date (d) the sequence number and (e) the denominational breakdown of the contents of the drawer.

The remote terminal 21 stores in a database the details of transactions received by the intelligent cash drawer unit 1 the first EPOS terminals 19*a*, 19*b*, 19*n*, based on the unique identifiers relating to each user, and reconciles the amount of currency that should have been received/dispensed as calculated by the EPOS terminal for each transaction, with that actually received/dispensed as determined by the intelligent cash drawer unit 1.

The remote management terminal 21 as set out above, receives and reconciles data from respective EPOSs 19*a*-*n* and cash drawers 1, matching up sets of transactions, using the identifiers associated with the user (obtained from tags 27, in this embodiment). The data from the intelligent cash drawer unit 1 is then compared with the data from the respective EPOS 19*a*-*n* for the production of reports and/or sending of alerts in the event of a data mismatch (e.g. apparently missing cash, which may have been stolen).

Additionally, the remote management terminal 21 is arranged to verify that all data packets sent from each intelligent cash drawer unit 1 have been received. To do this, the remote management terminal checks (e.g. periodically) that for each intelligent cash drawer unit 1*a*-1*n* there are no gaps in the sequence numbers received from the respective intelligent cash drawer unit 1*a*-*n*. Data from the respective intelligent cash drawer units may be stored in a database in sequence number order, and those skilled in the art will readily conceive of suitable algorithms to identify missing numbers in a list that if correct is consecutive.

Where a missing data packet is identified, the remote management terminal 21 is operable to send a request for certain particular data, identified by sequence number to the relevant intelligent cash drawer unit 1, from which data was found to be missing. In response, the controller 8 of the relevant intelligent cash drawer unit 1 operates to retrieve the missing information from memory 9, and forward it to the remote management terminal 21.

As mentioned above, the cash drawer 1 can be used with an optional EPOS safe 25. This method is described below, with reference to FIGS. 3-5.

As shown schematically in FIG. 5, an exemplary EPOS safe 25 is formed of a note acceptor 31 arranged to receive high value currency, a counterfeit detector 32 arranged to receive notes from the note acceptor and, if detected as counterfeit to dispense them from a note dispenser 33, or if found to be genuine, to store them in note cassettes 34. This operation is controlled by a controller 35, operating in accordance with instructions stored in memory 36, and also operable to dispense notes from note dispenser 33 in response to a dispense signal.

Such a dispense signal would normally be provided by an EPOS terminal directly connected to the EPOS Safe 25 and to which it would report, but the EPOS safe 25 of this invention is also provided with an intelligent cash drawer interface 37, through which it draws power from and communicates with, via the transceiver of the EPOS Safe interface 25, the intelligent cash drawer unit 1, directly connected to it via a cable 38, for example a USB, Serial or Ethernet cable. Data and power can be exchanged between the intelligent cash drawer unit and the intelligent point of sale safe through the same cable.

The receiver of the intelligent cash drawer unit 1 is operable to receive a signal from the intelligent point of sale safe 25 comprising data relating to the contents of the intelligent point of sale safe 25. In consequence, when used with the optional EPOS Safe 25, the intelligent cash drawer unit 1 can also report on the contents of the safe.

Thus the intelligent point of sale safe 25 acts as an extension to the virtual cash holding unit provided by the intelligent cash drawer unit (which based on the reconciliation which occurs at the remote terminal, can record all the transactions associated with a particular user, as if it is that user's unit.

In operation, when an intelligent point of sale safe 25 is used in tandem with the intelligent cash drawer 1, upon receipt of the identifier associated by the user, the access module 29 not only sends a signal to the actuator 10 to open the intelligent cash drawer, but sends a signal via the EPOS safe interface 24 to allow access to the EPOS safe 25 (e.g. allowing rollers (not shown) to nip and pull-in notes into the note acceptor 31. Similarly, when the sensor 12 detects that the intelligent cash drawer 1 is closed, or a predetermined time thereafter, the access module 29 can send a signal to the intelligent EPOS safe 25 to no longer allow access. This is useful to ensure that a transaction is complete before any report.

Once access is no longer allowed to the EPOS safe 25, its controller outputs a signal via the cash drawer interface 37 to the cash drawer, with information relating to its contents. For example, an indication of the number of notes of each denomination stored in the note cassettes 34 and hence the total value. The reporting module 30 of the intelligent cash drawer 1 then prepares a report in the form of a data packet comprising (a) the identifier relating to a user (obtained from their tag 27), (b) data relating to the contents of the intelligent cash drawer unit and the intelligent point of sale safe (optionally collated, but alternatively separately) and additionally (c) the serial number of the drawer; (d) the time and date, (e) a sequence number identifying the transaction and (f) in the event that a counterfeit note was tendered and rejected by the safe, a flag to that effect.

In the present embodiment, the data relating to the contents of the intelligent cash drawer unit 1 and the intelligent point of sale safe 25 is reported as a denominational breakdown of the contents of the intelligent cash drawer unit land the intelligent point of sale safe 25 and the serial number of the safe 25 is also included in the report. The report is sent via the network interface 14 to the external devices 20, 21, which compare data received from the intelligent cash holding units 1, 25, with the data received from the EPOS terminals 19, on the basis of the identifier relating to the user, to check that the correct amount of money was received/dispensed, in accordance with the transaction recorded at the EPOS terminal 19.

Those skilled in the art will appreciate that whilst the report is described as being prepared at and reported by the intelligent cash drawer 1 of this invention, which is connected to the network 18 and the ID system 28, the intelligent point of sale safe 25 could be modified to connect to the network and/or the ID system 26. That is to say, that rather than being the "dumber" of the two intelligent cash holding units 1, 25, it could have greater functionality.

If it is connected to the ID system 26, the intelligent point of sale safe 25 could send a signal comprising a data packet in which the identifier associated with the user and the data relating to the contents of the intelligent point of sale safe. The intelligent cash drawer could then act in response to the signal as described above, opening the drawer, calculating the contents of the cups 2*a-f*, 3*a-h* and sending on a data packet comprising (a) the identifier relating to a user (obtained from their tag 27), (b) data relating to the contents of the intelligent cash drawer unit and the intelligent point of sale safe (optionally collated, but alternatively separately) and additionally (c) the serial number of the drawer; (d) the time and date, (e) a sequence number identifying the transaction and (f) in the event that a counterfeit note was tendered and rejected by the safe, a flag to that effect.

If, it is connected to the local network, the EPOS safe could receive that signal and forward it on to the management terminals 20, 21. Alternatively, it could request the information required from the intelligent cash drawer unit 1 and prepare and send the report at its own end.

As discussed above, the signal comprising the identifier associated with the user is received from a suitable identification system connected to the intelligent cash drawer unit, which reads an RFID tag. It could alternatively be a card reader (e.g. magnetic strip or near field communication), a barcode reader, a biometric reader or any other similar device. It could also be integral with the intelligent cash holding unit 1, 25) rather than being connected thereto.

The details of the management terminals 20, 21 have not been described at length. They may be typical such terminals arranged to track activity and reconcile transactions. The management terminals 20, 21 of the invention are operable to reconcile transactions carried out by a user on a separate EPOS and intelligent cash drawer unit, by receiving from the intelligent cash holding unit 1, 25 data relating to the contents of the intelligent cash holding unit 1, 25 together with an identifier relating to the user and receiving from the EPOS terminal 19*a-n* data indicating the amount owed together with an identifier relating to the user and comparing the data where the identifiers relating to the user match. The comparison is done where the identifiers relating to the users and time stamps included in the data match.

The above embodiment is described by way of example only. Many variations are possible without departing from the scope of the invention as defined in the appended claims.

The invention claimed is:

1. A cash management system, the cash management system comprising a management terminal, a plurality of Electronic Point of Sale (EPOS) terminals and at least one intelligent cash holding unit; the at least one intelligent cash holding unit comprising a receiver operable to receive a signal comprising an identifier associated with a user, an access module operable, in response to the received signal, to allow access to the at least one cash holding unit, a counter which increments each time access is allowed to provide a sequence number identifying a transaction at the at least one cash holding unit, and a controller operable, in response to the received signal, to allow access to the at least one intelligent cash holding unit, wherein the controller is further operable to send a report comprising an identifier relating to the user to the management terminal; wherein the at least one intelligent cash holding unit comprises a cash counting apparatus;

wherein the report comprises data relating to the contents of the at least one intelligent cash holding unit and the sequence number identifying the transaction;

wherein each EPOS terminal is operable to calculate an amount owed based on inputs and operable to output the amount owed to the management terminal together with an identifier identifying the user;

wherein there are a greater number of EPOS terminals than intelligent cash holding units, wherein the at least one intelligent cash holding unit acts as a virtual cash holding unit for more than one EPOS terminal; and wherein the management terminal reconciles transactions carried out by a user of an EPOS terminal with cash transactions carried out by said user at a shared intelligent cash holding unit and wherein the management terminal is arranged to verify that all data packets sent from each intelligent cash holding unit have been received by checking that for each intelligent cash holding unit there are no gaps in the sequence numbers received from the respective intelligent cash holding unit, wherein if a missing data packet is identified, the management terminal is operable to send a request for certain particular data, identified by sequence number to the relevant intelligent cash holding unit.

2. A cash management system according to claim 1; the at least one intelligent cash holding unit integrally comprising, or attached to an identification system arranged to provide the signal comprising the identifier associated with the user wherein the identification system is a card reader, RFID reader, barcode reader or biometric reader.

3. A cash management system according to claim 1 wherein the data relating to the contents of the at least one intelligent cash holding unit is selected from the group consisting of: a total amount added to or removed from the at least one intelligent cash holding unit; a number of items of each denomination held in the at least one intelligent cash holding unit; an indication of a total value of each denomination; an indication of a total value of all denominations; and a weight of cash in each of a plurality of note cups and/or coin cups.

4. A cash management system according to claim 1 wherein the controller is operable to send the report as a data packet, in which the identifier relating to the user and data relating to the contents of the at least one intelligent cash holding unit are collated.

5. A cash management system according to claim 1, wherein the at least one intelligent cash holding unit comprises a memory, in which is stored a serial number associated with the at least one intelligent cash holding unit; wherein the controller is operable to transmit the serial number in the report.

6. A cash management system according to claim 1 wherein the at least one intelligent cash holding unit comprises a timing unit, wherein the controller is operable to transmit and/or to store a time, or the time and a date, of each event when a signal received, access is allowed, or a report is sent; wherein the timing unit is a real-time clock provided with an independent power source.

7. A cash management system according to claim 1 wherein the at least one intelligent cash holding unit is an intelligent cash drawer unit and wherein the controller is operable to send a signal to an actuator to open the intelligent cash drawer unit; and wherein a drawer of the intelligent cash drawer unit comprises a plurality of note cups and coin cups supported by transducers arranged to determine a weight of the contents of the cups and a value of the currency in the intelligent cash drawer unit.

8. A cash management system according to claim 1, wherein the management terminal is operable to send an alert when a data mismatch is determined between the transactions carried out by the user of the EPOS terminal with transactions carried out by said user at the shared intelligent cash holding unit.

9. A cash management system according to claim 1 wherein one or more EPOS terminals and one or more or each of the at least one intelligent cash holding unit comprises a reader, either integrally, or connected to the intelligent cash holding unit and/or EPOS terminal.

10. A cash management system according to claim 9 wherein each reader is arranged to read a tag or biometric feature associated with a user comprising the identifier associated with the user.

11. A cash management system according to claim 10 comprising tags, each tag comprising the identifier associated with the user and readable by the readers associated with both the EPOS terminals and the at least one intelligent cash holding unit.

12. A cash management system according to claim 11 wherein the management terminal is operable to reconcile transactions by comparing an amount owed to a particular user with an amount introduced into the at least one intelligent cash holding unit by the particular user, based on the identifier associated with the particular user's tag.

13. A cash management system, the cash management system comprising a management terminal, a plurality of Electronic Point of Sale (EPOS) terminals and at least one intelligent point of sale safe, wherein there are a greater number of EPOS terminals than intelligent point of sale safes, whereby the at least one intelligent point of sale safe acts as a virtual cash holding unit for more than one EPOS terminal; the management terminal operable to reconcile transactions carried out by a user on a separate EPOS terminal and intelligent point of sale safe; wherein:

the at least one intelligent point of sale safe comprises a receiver operable to receive a signal comprising an identifier associated with a user, an access module operable, in response to the received signal, to allow access to the intelligent point of sale safe, a counter which increments each time access is allowed to provide a sequence number identifying a transaction at the at least one intelligent point of sale safe, and a controller operable, in response to the received signal, to allow access to the at least one intelligent point of sale safe, wherein the controller is operable to send a report comprising an identifier relating to the user and data relating to the contents of the at least one intelligent point of sale safe and the sequence number identifying the transaction to at least one external device; wherein the plurality of EPOS terminals are operable to calculate an amount owed based on inputs and operable to output the amount owed to the management terminal together with an identifier relating to the user; and wherein the management terminal is operable to reconcile data by receiving from the at least one intelligent point of sale safe data relating to the contents of the at least one intelligent point of sale safe together with the identifier relating to the user and by receiving from the EPOS terminal data indicating the amount owed together with the identifier relating to the user and comparing the data where the identifiers relating to the user match and wherein the management terminal is arranged to verify that all data packets sent from each intelligent point of sale safe have been received by checking that for each intelligent point of sale safe there are no gaps in the sequence numbers received from the respective intelligent point of sale safe, wherein if a missing data packet is identified, the management terminal is operable to send a request for certain particular data, identified by sequence number to the relevant intelligent cash holding unit.

14. A cash management system according to claim 13, wherein the management terminal is configured to send an alert when a data mismatch is determined when comparing the data where the identifiers relating to the user match.

* * * * *